(12) United States Patent
Valecha et al.

(10) Patent No.: US 11,410,174 B2
(45) Date of Patent: Aug. 9, 2022

(54) CUSTOM BLOCKCHAIN FOR IOT DEVICES

(71) Applicant: INTERNATIONAL BUSINESS MACHINES CORPORATION, Armonk, NY (US)

(72) Inventors: Vinod A. Valecha, Pune (IN); Krzysztof Rudek, Nowy Wisnicz (PL); Markus Blohberger, Warngau (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/057,018

(22) Filed: Aug. 7, 2018

(65) Prior Publication Data

US 2020/0051081 A1 Feb. 13, 2020

(51) Int. Cl.
*G06Q 20/40* (2012.01)
*G06Q 20/38* (2012.01)

(52) U.S. Cl.
CPC ......... *G06Q 20/401* (2013.01); *G06Q 20/382* (2013.01)

(58) Field of Classification Search
CPC . H04L 2209/38; H04L 67/10; H04L 2209/60; H04L 2463/102; H04L 43/106; H04L 45/7453; H04L 63/123; H04L 63/1425; H04L 67/108; H04L 67/1095; H04L 67/12; H04L 67/2823; H04L 9/0637; H04L 9/3239; G06F 16/27; G06F 21/64;
(Continued)

(56) References Cited

U.S. PATENT DOCUMENTS 9,077,580 B1 * 7/2015 Randhawa ............ G06F 3/0653
10,250,708 B1 * 4/2019 Carver .................. H04L 67/108
(Continued)

FOREIGN PATENT DOCUMENTS

WO 2017145005 A1 8/2017
WO 2017187397 A1 11/2017
(Continued)

OTHER PUBLICATIONS

Fakhruddin, "Blockchain In IoT: The Future Of Smart Connectivity", Teks Mobile Teknowledge Software, Aug. 30, 2017, pp. 1-6.
(Continued)

*Primary Examiner* — Slade E Smith
(74) *Attorney, Agent, or Firm* — Teddi E. Maranzano

(57) ABSTRACT

A computer-implemented method for verifying a transaction in a blockchain network may be provided. The blockchain network comprises nodes participating in performing the transaction. The method comprises grouping the nodes of the blockchain network into a plurality of clusters of nodes. For each cluster, the method comprises determining for each node of the cluster performance parameter values, calculating a weighted sum of the determined performance parameter values, designating the node with the highest weighted sum as cluster leader, designating a number of nodes of the cluster whose weighted sum is next to the highest weighted sum, as sub-cluster leader, the number being at least half of the total number of nodes within said cluster, and verifying the transaction for the cluster by the cluster leader and the sub-cluster leaders.

19 Claims, 4 Drawing Sheets

(58) Field of Classification Search
CPC ............... G06F 9/445; G06Q 20/1235; G06Q 20/3825; G06Q 20/3827; G06Q 2220/00; G06Q 20/401; G06Q 20/382; H04W 12/10; H04W 8/24
USPC .......................................................... 705/39
See application file for complete search history.

(56) References Cited

U.S. PATENT DOCUMENTS

| | | | |
|---|---|---|---|
| 2003/0204625 A1* | 10/2003 | Cain | H04L 45/00 709/239 |
| 2006/0026599 A1* | 2/2006 | Herington | G06F 9/5083 718/105 |
| 2014/0075002 A1* | 3/2014 | Pradhan | H04L 67/53 709/223 |
| 2014/0172708 A1* | 6/2014 | Chrapko | G06Q 20/0655 705/44 |
| 2014/0195984 A1* | 7/2014 | Aslam | G06Q 50/265 715/853 |
| 2015/0293992 A1* | 10/2015 | Meehan | G06F 16/2246 707/740 |
| 2017/0116315 A1* | 4/2017 | Xiong | G06F 16/2228 |
| 2017/0236103 A1* | 8/2017 | Biton | G06Q 20/389 705/64 |
| 2017/0332239 A1* | 11/2017 | Vaughn | H04L 63/104 |
| 2017/0367023 A1* | 12/2017 | Demchenko | G06F 16/2365 |
| 2018/0012311 A1* | 1/2018 | Small | G06Q 20/3825 |
| 2018/0018738 A1* | 1/2018 | Bernauer | G06Q 50/184 |
| 2018/0060496 A1* | 3/2018 | Bulleit | G16H 40/63 |
| 2018/0082296 A1* | 3/2018 | Brashers | G06Q 20/405 |
| 2018/0109541 A1* | 4/2018 | Gleichauf | H04W 12/10 |
| 2018/0123779 A1* | 5/2018 | Zhang | H04L 9/3247 |
| 2018/0174231 A1* | 6/2018 | Chenard | G06Q 20/389 |
| 2018/0189753 A1* | 7/2018 | Konda | H04L 9/0637 |
| 2018/0204192 A1* | 7/2018 | Whaley | G06Q 20/3829 |
| 2018/0255125 A1* | 9/2018 | Chrapko | G06Q 40/04 |
| 2018/0285972 A1* | 10/2018 | Chrapko | H04L 41/5096 |
| 2018/0337847 A1* | 11/2018 | Li | H04L 45/64 |
| 2018/0341930 A1* | 11/2018 | Moir | H04L 9/3239 |
| 2018/0357683 A1* | 12/2018 | Pickover | G06Q 30/0282 |
| 2018/0359089 A1* | 12/2018 | Innes | G06F 16/182 |
| 2019/0013943 A1* | 1/2019 | Maim | H04L 9/30 |
| 2019/0026146 A1* | 1/2019 | Peffers | G06F 9/466 |
| 2019/0043050 A1* | 2/2019 | Smith | G06Q 20/389 |
| 2019/0058709 A1* | 2/2019 | Kempf | G06Q 30/06 |
| 2019/0058719 A1* | 2/2019 | Kar | H04L 63/1425 |
| 2019/0081793 A1* | 3/2019 | Martino | H04L 9/0894 |
| 2019/0114584 A1* | 4/2019 | Toohey | G06Q 10/083 |
| 2019/0149418 A1* | 5/2019 | Bertsche | G06Q 20/1235 707/625 |
| 2019/0173666 A1* | 6/2019 | Ardashev | H04L 9/3239 |
| 2019/0180276 A1* | 6/2019 | Lee | H04L 63/102 |
| 2019/0199514 A1* | 6/2019 | Hari | H04L 9/0637 |
| 2019/0199787 A1* | 6/2019 | Carver | H04L 45/64 |
| 2019/0220324 A1* | 7/2019 | Carver | H04L 9/3297 |
| 2019/0238525 A1* | 8/2019 | Padmanabhan | G06F 21/6245 |
| 2019/0251199 A1* | 8/2019 | Klianev | G06F 11/1662 |
| 2019/0349733 A1* | 11/2019 | Nolan | H04L 67/562 |
| 2019/0354723 A1* | 11/2019 | Dassenno | H04L 63/126 |
| 2020/0145283 A1* | 5/2020 | Zeng | H04L 41/0677 |

FOREIGN PATENT DOCUMENTS

WO 2017220169 A1 12/2017
WO 2018014123 A1 1/2018

OTHER PUBLICATIONS

Dickson, "How blockchain can change the future of IoT", Tech Talks, Nov. 20, 2016, pp. 1-6.

* cited by examiner

CUSTOM BLOCKCHAIN FOR IOT DEVICES

BACKGROUND

The invention relates generally to a method for verifying a transaction, and more specifically, to a computer-implemented method for verifying a transaction in a blockchain network. The invention relates further to a related blockchain verification system for verifying a transaction in a blockchain network, and a computer program product.

Implementation of blockchain technology for tracking goods and assets has become increasingly popular. Software development and service companies are continuously expanding their blockchain. More and more, traditional and centrally organized transaction systems undergo a metamorphosis to become distributed systems utilizing blockchain. This may increase the reliability level of a transaction system because no central point of failure exists. Also, general ledger systems are already implemented in blockchain technology. On the other side, also crypto currencies rely on the blockchain technology.

The Internet of Things (IoT) field has also seen an increase in research and development attempts to use blockchain technology. IoT encompasses a fast-growing network of interconnected sensors of all kinds, as well as, actuators connected to a centralized or decentralized control instance. Many self-regulated and self-controlled systems, e.g., robots, assembly lines, service chains, etc., emerge.

One example of such self-controlled systems are autonomous vehicles, equipped with a plurality of sensors like radar, laser light, GPS, odometry, computer vision, just to name a few. These sensors are used to detect the surroundings of the autonomous vehicle. Advanced control systems may interpret sensor information to identify appropriate navigation paths, as well as, obstacles and relevant signage. Autonomous vehicles must have control systems that are capable of analyzing sensor data to distinguish between different vehicles or other things on the road.

In the current form, there are some limitations with IoT components that are involved in autonomous vehicles. Currently, often a broker-based networking paradigm is used, which relies on a central cloud computing server. Consequently, threats such as device spoofing and impersonation are possible. Moreover, payment mechanisms are not well-defined, and they are typically governed by a central service on a central server.

Blockchain technology provides a distributed ledger, instead of a central database. The distributed ledger is made up of blocks of data that are chained together with cryptographic techniques and makes it almost impossible to make changes to the ledger once something has been recorded. In public or permission-based blockchain ledgers, everyone can read or write data. Trust comes from the way transactions are recorded.

Private or commissioned blockchain ledgers are set up among a control group of participants that are known and trusted. Blockchain distributed ledgers can be used to not only store the proof of delivery records but also instructions on what to do (terms of the contract—micro-contracts) and scripts to execute the instructions.

However, blockchain technology suffers from high (processing and packet) overhead, low scalability, and low throughput. The consensus algorithm employed in blockchains involves resolving a hard-to-solve easy-to-verify puzzle that consumes significant computational resources. All transactions and blocks are broadcasted to the entire network, which results in pronounced packet overhead. Additionally, this raises a scalability issue as the number of broadcast packets increases quadratically with a number of participating nodes. Thus, there is a need to address these issues in order to apply the blockchain technology to new application areas.

BRIEF SUMMARY

According to one aspect of the present invention, a computer-implemented method for verifying a transaction in a blockchain network may be provided. The blockchain network may include nodes participating in performing the transaction. The method may include grouping the nodes of the blockchain network into a plurality of clusters of nodes. For each cluster the method may also include determining for each node of the cluster performance parameter values, calculating a weighted sum of the determined performance parameter values, designating the node with the highest weighted sum as cluster leader, designating a number of nodes of the cluster whose weighted sum is next to the highest weighted sum, as sub-cluster leader, the number being at least half of the total number of nodes within said cluster, and verifying the transaction for the cluster by the cluster leader and the sub-cluster leaders.

Optionally, the performance parameter values may include at least one parameter selected from the group consisting of a number of transactions performed by the node in a first given time period, a number of transactions verified by the node in a second given time period, a period during which the node has been part of the blockchain network, a percentage of up-time of the node in the blockchain network, and a processing power of the node.

In yet another optional aspect of the present invention, the transaction may be part of a distributed ledger program.

In yet another optional aspect of the present invention, the nodes may be geographically distributed.

In yet another optional aspect of the present invention, the nodes of one of the clusters may be co-located.

In yet another optional aspect of the present invention, the clusters may be geographically distributed.

In yet another optional aspect of the present invention, a portion of the nodes of one of the clusters may be of different technical architectures and/or may run under different operating systems.

In yet another optional aspect of the present invention, a plurality of transactions may be combined to a block and a copy of the block may be stored by each designated cluster leader.

According to another aspect of the present invention, a related blockchain verification system for verifying a transaction in a blockchain network may be provided. Also here, the blockchain network may include nodes participating in performing the transaction. The system may include a plurality of clusters, each cluster including a plurality of nodes of the blockchain network.

Each cluster may include a determination unit adapted for determining for each node of the cluster performance parameter values and a calculation unit adapted for calculating a weighted sum of the determined performance parameter values. Each cluster may also include a designation unit adapted for designating the node with the highest weighted sum as cluster leader. The designation unit may also be adapted for designating a number of nodes of the cluster whose weighted sum is next to the highest weighted sum, as sub-cluster leaders. The number may be at least half of the total number of nodes within the cluster.

Furthermore, each cluster may include a verification unit adapted for verifying the transaction for the cluster by the cluster leader and the sub-cluster leaders.

Furthermore, embodiments may take the form of a related computer program product, accessible from a computer-usable or computer-readable medium providing program code for use by, or in connection, with a computer or any instruction execution system. For the purpose of this description, a computer-usable or computer-readable medium may be any apparatus that may contain means for storing, communicating, propagating or transporting the program for use by, or in connection, with the instruction execution system, apparatus, or device.

An advantage of the present invention is that by using cluster leaders, main weak points of the blockchain technology may be eliminated because the weakest node is not the bottleneck of the whole system. However, by combining a plurality to a cluster of nodes of the blockchain network, the performance-wise strongest node of the cluster may confirm the transaction representing the complete cluster.

Another advantage of the present invention is that in order to increase the reliability and trustworthiness, sub-cluster leaders with the next best performance values may also be involved and may confirm transactions

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
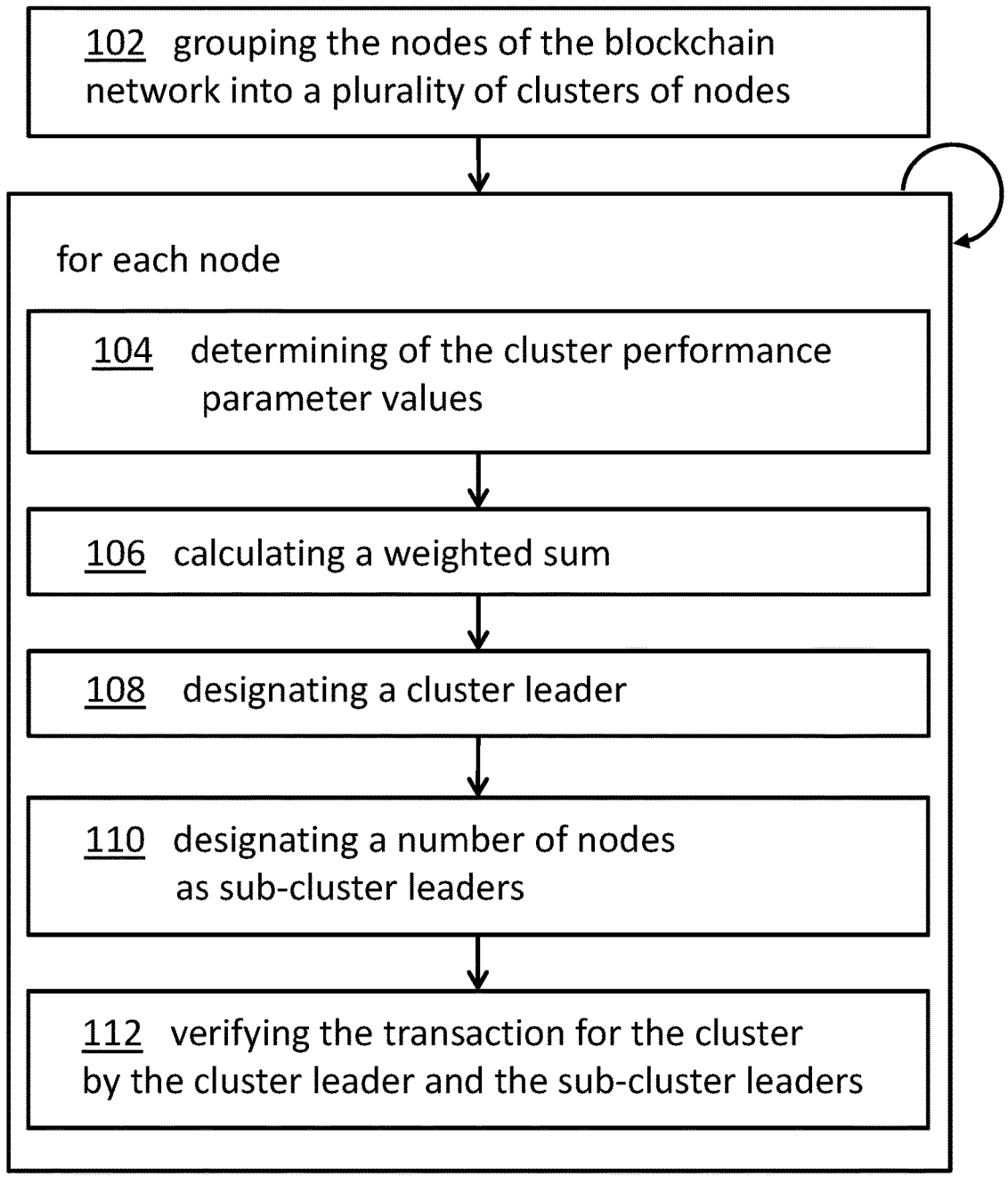

Preferred embodiments of the invention will be described, by way of example only, and with reference to the following drawings:

FIG. 1 shows a block diagram of an embodiment of the inventive computer-implemented method for verifying a transaction in a blockchain network.

Figure 2:
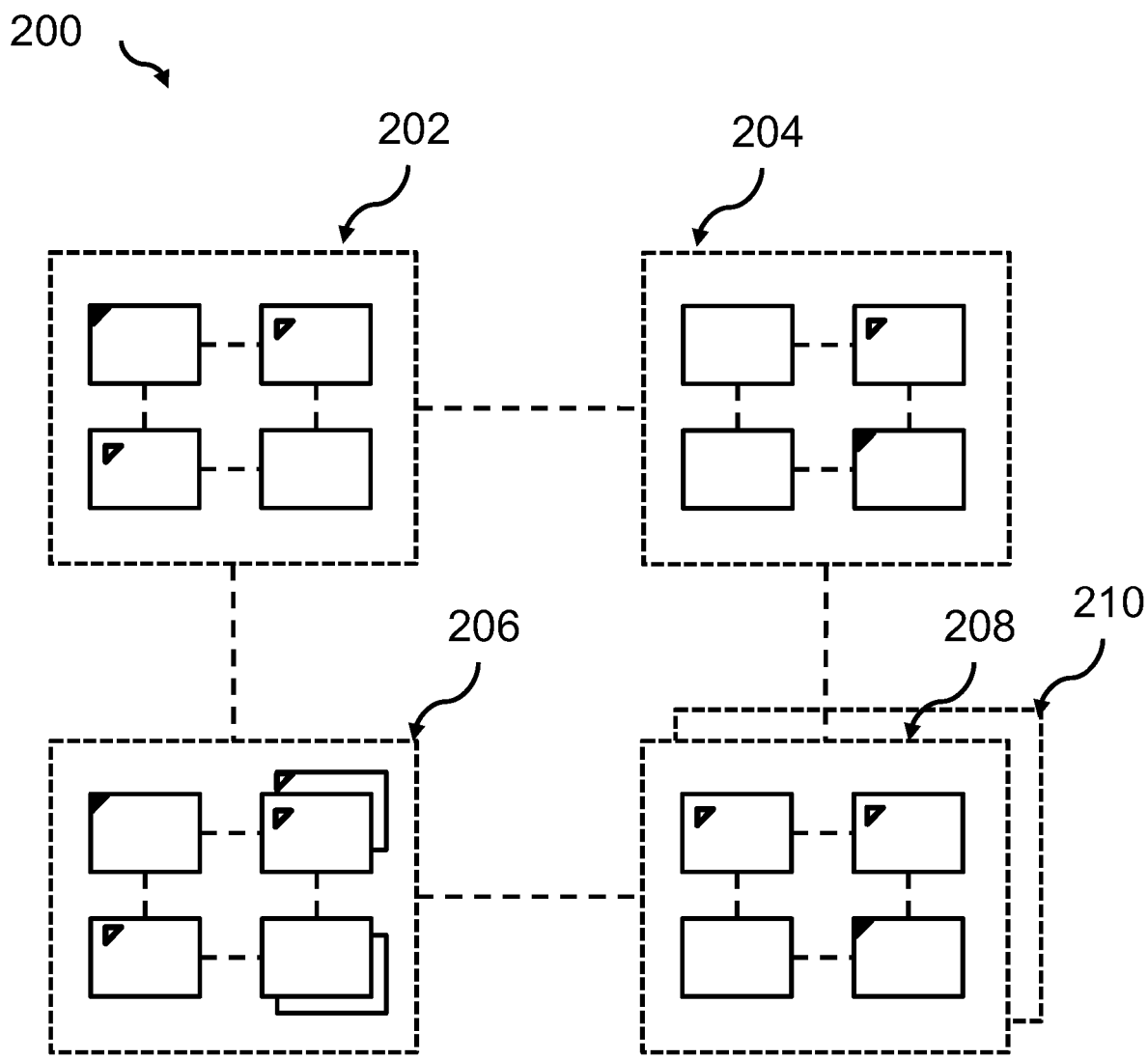

FIG. 2 shows a block diagram of an embodiment of several clusters of a blockchain network.

Figure 3:
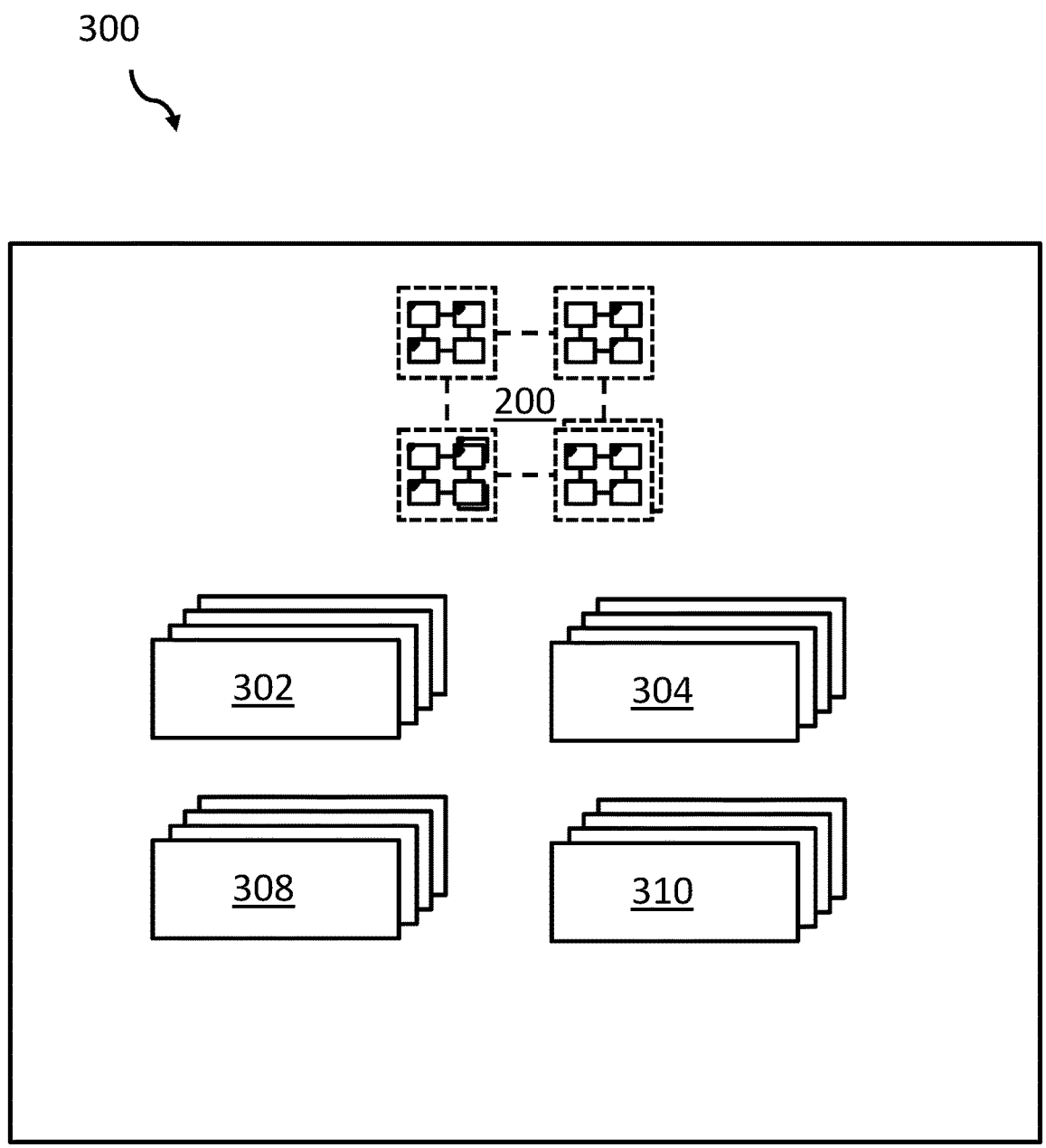

FIG. 3 shows a block diagram of an embodiment of a system for verifying a transaction in a blockchain network.

Figure 4:
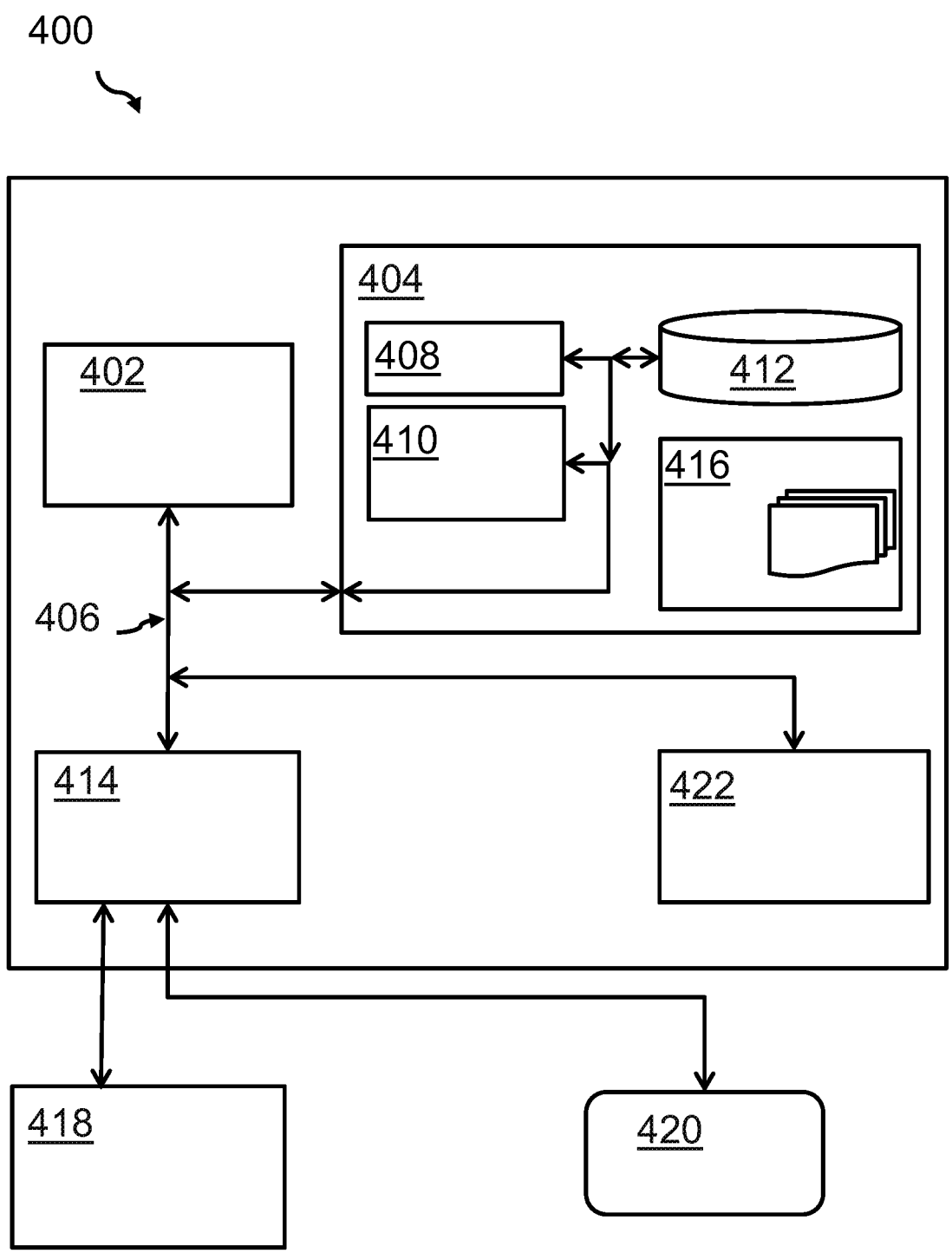

FIG. 4 shows a block diagram of an embodiment of a computing system instrumental as a node of the blockchain network.

DETAILED DESCRIPTION

In the context of this description, the following conventions, terms and/or expressions may be used:

The term 'transaction' may denote a safe and controlled exchange and recording of an electronic message. The electronic message may include measurement data of a sensor in a computer network, e.g., the Internet of Things, or a transaction may confirm an order or a financial transaction. According to computer science theories, each transaction must succeed or fail as a complete unit; it can never be only partially complete. Typically, a transaction may be related to a record in the ledger system.

The term 'blockchain' may denote a continuously growing list of records, called blocks, which are linked and secured using cryptography. Each block typically may contain a cryptographic hash of the previous block, a timestamp, and transaction data. By design, a blockchain may be resistant to modification of the data. It may represent "an open, distributed ledger that can record transactions between two parties efficiently and in a verifiable and permanent way". For use as a distributed ledger, a blockchain may typically be managed by a peer-to-peer network collectively adhering to a protocol for inter-node communication and validating new blocks. Once recorded, the data in any given block cannot be altered retroactively without alteration of all subsequent blocks, which requires consensus of the network majority.

Blockchains are secure by design and exemplify a distributed computing system with high Byzantine fault tolerance. Decentralized consensus has therefore been achieved with a blockchain. This may render blockchains potentially suitable for the recording of events, medical records, and other record management activities, such as identity management, transaction processing, documenting provenance, food traceability, voting, as well as an exchange of measurement data and/or actuator data in an industrial or Internet of Things network.

The term 'node' may denote a computing system enabled to handle blockchain transactions. The nodes may be of various type and/or architecture and may run different operating systems. Their performance abilities to handle blockchain transactions, network bandwidth, storage and/or memory capacities, and processing power may vary from node to node.

The term 'cluster' may denote a group of nodes, i.e., computing nodes or computing systems. The grouping may be performed according to predefined rules such as a geographical co-location, e.g., being installed in the same data center or, other technical restrictions or rules.

The term 'weighted sum' may denote a mathematical operation used for performing a sum or average to give some elements—in particular to a plurality of different performance values—more "weight" or influence on the result than other elements, i.e., performance values in the same set of values. The result of this application of a weight function is a weighted sum or weighted average.

The term 'cluster leader' may denote the node of a cluster having the highest weighted sum of performance parameter values. Some examples of performance parameter values may be: a number of transactions performed by the respective node in a given past time period, a number of transactions verified by the respective node in a given past time period, a period during which the respective node has been part of said blockchain network, a percentage of up-time of the respective node in said blockchain network, and a processing power value—in particular, measurable in floating point operations per second (FLOPs), or number of hash calculations, or comparable metric—of the respective node. Other examples may be memory and/or storage capacities, network bandwidth, CPU clock rate, number of CPUs, bus throughput, number of threads per CPU and other performance parameters known by a person skilled in the art.

The term 'sub-cluster leader' may denote one or more nodes in a cluster of the blockchain network, having not the highest weighted sum of performance parameter values, but those that come next to the highest weighted sum of the performance parameter values; thus, those nodes with the second highest weighted sum of performance parameter values, the third, the fourth and so on. It may be preferable to define about, or at least, 50% of all nodes of a cluster as sub-cluster leaders. Preferably, the number of nodes, including the cluster leader node as well as the sub-cluster leader nodes, may be more than 50% of all nodes of the cluster. Alternatively, also only those nodes of a cluster of the blockchain network may be named cluster leader and sub-cluster leader representing a predefined number or a predefined percentage of the weighted sums of the performance parameters of the nodes of the cluster.

The term 'verifying the transaction' may denote a conclusion of the transaction information in a block that is published to the network (after a transaction is broadcasted to the blockchain network). When that happens it is said that the transaction has been mined at a depth of 1 block. With each subsequent block that is found, the number of the block depth is increased by one. To be secure against wrong bookings, a transaction should not be considered as confirmed until it is a certain number of blocks deep. It may also be noted that in blockchain technology, typically transactions do not expire. Thus, slowed network connections—e.g., in the Internet of Things—may be used as part of the here proposed concept.

The term 'processing power' may denote any adequate performance parameter allowing measurement of a computing strength of a given computing system, e.g., a node in the blockchain network. It may, e.g., be the number of floating point operations per second executable by a CPU of the node, the number of hash value calculations required for a blockchain, or similar. In a simple way, it may also be the clock speed of a processor. However, this performance parameter may only be useful if the architectures of the different nodes are identical or closely related (e.g., using the same CPU and bus architecture).

The proposed computer-implemented method for verifying a transaction in a blockchain network may offer multiple advantages and technical effects:

Blockchain technology is the missing link to settle privacy and reliability concerns in the Internet of Things. It may be the silver bullet needed for the whole IoT industry. For example, it may be used in tracking millions of connected devices, e.g., vehicles, and enabling the processing of transactions and coordination between them; this may allow for significant savings in the automotive industry, as well as other industries. The decentralized approach having the blockchain technology as the core element, would eliminate single points of failure, single points of attack and, may create a more resilient ecosystem for devices that are connected to it.

An advantage of the present invention is that by using cluster leaders, main weak points of the blockchain technology may be eliminated because the weakest node is not the bottleneck of the whole system. However, by combining a plurality to a cluster of nodes of the blockchain network, the performance-wise strongest node of the cluster may confirm the transaction representing the complete cluster.

Another advantage of the present invention is that in order to increase the reliability and trustworthiness, sub-cluster leaders with the next best performance values may also be involved and may confirm transactions.

By using a weighted sum of performance parameter values for the nodes, embodiments of the present invention may achieve a balanced approach to performance benchmark values. Thus, depending on the application area, a different balance of some of the performance parameter values may be appropriate. By setting the different scaling factors for the different performance parameter values, an adaptation to various requirements in different vertical industry application areas may easily be possible.

The ledger is temper-proof and cannot be manipulated by malicious actors because it does not exist in any single location. Furthermore, man-in-the-middle attacks cannot be staged because there is no single threat of communication that can be intercepted. Blockchain makes trustless (without the requirement for a trusted middleman), peer-to-peer messaging possible and has already proven its worth in the world of financial services through crypto currencies such as bitcoin, providing guaranteed peer-to-peer payment services without the need for third-party brokers.

The decentralized, autonomous, and trustless abilities of the blockchain may make it an ideal component to become a foundational aspect of IoT solutions for autonomous vehicles or other connected devices. In an IoT network, the blockchain may keep an immutable record of the history of smart devices and its sensor data. This feature may enable the autonomous functioning of vehicles and other autonomous systems without the need for a centralized authority. As a result, the blockchain opens the door to a service of IoT scenarios that were remarkably difficult or, even impossible to implement without it.

For example, by leveraging the blockchain technology, IoT solutions can enable secure, trustless messaging between multiple autonomous systems in an IoT network. In this model, the blockchain will treat message exchanges between autonomous systems similar to financial transactions in a bitcoin network. To enable message exchanges, devices may leverage smart contracts which then model the agreement between the two related constituents.

The distributed ledger may enable autonomous systems to efficiently manage the transport of goods or passengers and execution of smart rules and workflows. The ledger may create an entire eco-system of efficient management of autonomous systems, e.g., vehicles.

Embodiments of the present invention may replace the obligation for solving a computational puzzle like in bitcoins, with a scheduled block generation process, and thus, eliminating the significant processing overhead of conventional blockchains in which each and every node is included by definition. Each node will store one block at a given point in time. The scalability problems inherent in blockchain technology are solved by clustering the network in such a way that only a defined subset of nodes manage the blockchain. It dynamically adjusts the throughput to ensure that the blockchain throughput does not significantly deviate from the transaction load generated by the nodes of the network. This may decrease the processing time associated with validating blocks, i.e., message exchanges. As more blocks are stored in blockchains, the processing time for validating new blocks is significantly lower compared to conventional blockchain technologies.

In the following, an additional embodiment of the proposed method—also applicable to the related system—will be described:

According to one advantageous embodiment of the method, the performance parameter values may comprise at least one parameter selected out of the group comprising a number of transactions performed by the respective node in a given past time period, a number of transactions verified by the respective node in a given past time period, a period during which the respective node has been part of said blockchain network, a percentage of up-time of the respective node in said blockchain network, and a processing power value—in particular, measurable in FLOPs, number of hash calculations, or comparable—of the respective node. Other performance parameters may also be included. It may be useful if the performance parameters are easily accessible and do not require a lot of computing resources to extract them.

According to one preferred embodiment of the method, the transaction may be part of a distributed ledger program. However, other transaction methods and systems are also possible; basically, all methods and/or systems adapted for tracking transaction consistently. The transaction may relate to money/asset transfer. However, other sorts of tracking may also be possible. This may include, but is not limited to, medical drugs, container, information exchange in Internet-of-Things environments, a system for tracking down trademark infringements and similar. Basically, the proposed method may be applicable to any application area the general blockchain concept may be applicable to.

According to one permissive embodiment of the method, the nodes may be geographically distributed. Thus, geographical risk areas or political risk areas may by backed-up by redundant clusters. The geographical positioning of the clusters may follow geopolitical decision criteria. On the other side, they may also be distributed randomly, e.g., in the way the nodes join the blockchain network. It may also be possible to define logical areas treatable as logical geographies, according to specific geographic and or other organizational criteria for risks mitigation (e.g. same climatic zone, comparable political stability).

According to another permissive embodiment of the method, the nodes of one of the clusters may be co-located. Hence, they may be managed together, e.g., in one datacenter or in a datacenter and a related back-up datacenter. Or, in another permissive embodiment of the method, the clusters may be geographically distributed. Also this may help to mitigate risk.

According to one useful embodiment of the method, a portion of the nodes of one of the clusters may be of different technical architecture and/or run under different operating systems. Thus, there may be more than one of x86 type servers or nodes running Linux or Windows operating systems; other nodes may be based on other architectures like the one of zSystems, POWER systems, ARM-based, NVIDIA-based, or comparable, having their individual operating system. Thus, the clusters and nodes are not limited to be of similar structure.

According to one additional, preferred embodiment of the method, at least a portion of the nodes may comprise a co-processor for hash value calculations. This may be implemented in form of a dedicated co-processor due to the fact that hash-value calculations may be a requirement to confirm a transaction in a blockchain network.

According to an additional, advantageous embodiment of the method, a plurality of transactions may be combined to a block—in particular a block or group of transactions—and a copy of each block may be stored by each of the cluster leaders. One option may also comprise not to store the block on other nodes of the cluster; again another embodiment would make the block storable by one or more sub-cluster leader or, finally, by all nodes of the cluster.

In the following, a detailed description of the figures will be given. All instructions in the figures are schematic.

Firstly, a block diagram of an embodiment of the inventive computer-implemented method for verifying a transaction in a blockchain network is given. Afterwards, further embodiments, as well as embodiments of the blockchain verification system for verifying a transaction in a blockchain network, will be described.

FIG. 1 shows a block diagram of an embodiment of the computer-implemented method 100 for verifying a transaction in a blockchain network, the blockchain network comprising nodes—in particular computing nodes—participating in performing the transaction. The method 100 comprises grouping, 102, the nodes of the blockchain network into a plurality of clusters of nodes. For each cluster the method 100 comprises determining, 104, for each node of the cluster performance parameter values, calculating, 106, a weighted sum of the determined performance parameter values, and designating, 108, the node with the highest weighted sum as cluster leader.

The method 100 comprises also for each node designating, 110, a number of nodes of the cluster whose weighted sum is next to the highest weighted sum, as sub-cluster leader, the number being at least half of the total number of nodes within said cluster and, verifying, 112, the transaction for the cluster by the cluster leader and the sub-cluster leaders.

FIG. 2 shows a block diagram of an embodiment of several clusters of a blockchain network 200. Actually, five clusters 202, 204, 206, 208, 210 are shown. The clusters 202, 204, 208 comprise—as an example, but without any limitation—four nodes each. Cluster 206 is shown with six nodes. Each node is shown as a rectangle. The nodes are connected to each other via a communication network shown as dashed lines between some of the nodes. The communication network may, e.g., be based on the IP (Internet Protocol) technology. The clusters 202, 204 and 206 may have co-located nodes while the clusters themselves are geographically distributed. The clusters are symbolically communication-wise connected, which is shown as dashed line between the clusters.

Generally, the number of nodes per cluster is not limited. Thus, as an example, cluster 206 comprises eight nodes. Additionally, the cluster 208 and the cluster 210 are shown closely related to each other. They may both be housed in the same data center or in geographically closely related data centers. They may also symbolize a main data center and a backup datacenter. The grouping options are basically limitless.

Additionally, some of the rectangles symbolizing nodes of the clusters have black, filled triangles in the top left corner. It may be noted that each cluster 202, . . . , 208 (cluster 210 as well, but not shown) comprises at least one node with a black solid triangle. These black solid triangles indicate that the related nodes are the cluster leaders. Each cluster may comprise one cluster leader node, the node having the highest combined (weighted sum) performance parameter values.

Furthermore, some of the rectangles symbolizing the nodes of the related cluster comprise an empty triangle. The "empty triangle nodes" symbolize sub-cluster leaders, i.e., nodes of the blockchain network having a weighted sum of performance parameter values below the weighted sum of performance parameter value of the cluster leader. There may be more than one sub-cluster leader in each cluster. The number of sub-cluster leaders may comprise more than 50% of the total number of nodes in a given cluster.

As a simple form to compare the computer power and other relevant performance parameters for the nodes, the weighted sum of performance parameters may be calculated as follows:

$$P_{sum}=a*NT+b*N_{Tveri}+c*T_{BC}+d*T_{\%\ up}+e*P_{erf}$$

wherein

NT=number of transactions performed by the respective node in a given past time period, $N_{Tveri}$=number of transactions verified by the respective node in a given past time period, $T_{BC}$=period during which the respective node has been part of said blockchain network, $T_{\%\ up}$=a percentage of up-time of the respective node in said blockchain network, $P_{erf}$=processing power value—in particular, measurable in FLOPs, number of hash calculations, or comparable—of the respective node, and a, b, c, d, e are real values between 0 and 1.

This way, the weighted sum or weighted performance parameter values sum can be normalized. By choosing the multipliers a, b, c, d, e, it is possible to adapt the above formula to various application areas for different vertical industries and/or different types of supported blockchain technologies.

FIG. 3 shows a block diagram of an embodiment of the blockchain verification system 300 for verifying a transaction in a blockchain network 200. The blockchain network 200 comprises nodes participating in performing the transaction. The system comprises a plurality of clusters, each cluster comprising a plurality of nodes of the blockchain network 200.

For each cluster, the system 300 comprises a determination unit 302 adapted for determining, for each node of the cluster, performance parameter values, a calculation unit 304 adapted for calculating a weighted sum of the determined performance parameter values, a designation unit 308 adapted for designating the node with the highest weighted sum as cluster leader.

The designation unit 308 is also adapted for designating a number of nodes of the cluster whose weighted sum is less than the highest weighted sum, as sub-cluster leaders, the number of sub-cluster leaders being at least half of the total number of nodes within the respective cluster.

Finally, the system 300 comprises—for each cluster—a verification unit 310 adapted for verifying the transaction for the cluster by the cluster leader and the sub-cluster leaders.

Embodiments of the invention may be implemented together with virtually any type of computer, regardless of the platform being suitable for storing and/or executing program code. FIG. 4 shows, as an example, a computing system 400—in particular a node of the blockchain network—suitable for executing program code related to the proposed method.

The computing system 400 is only one example of a suitable computer system, and is not intended to suggest any limitation as to the scope of use or functionality of embodiments of the invention described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors or processing units 402, a system memory 404, and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, memory 404 may include at least one program product having a set (e.g., at least one) of program modules that are configured to carry out the functions of embodiments of the invention.

The program/utility, having a set (at least one) of program modules 416, may be stored in memory 404 by way of example, and not limiting, as well as an operating system, one or more application programs, other program modules, and program data. Each of the operating systems, one or more application programs, other program modules, and program data or some combination thereof, may include an implementation of a networking environment. Program modules 416 generally carry out the functions and/or methodologies of embodiments of the invention, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for verifying a transaction in a blockchain network, wherein the blockchain network comprises nodes participating in performing the transaction, the computer-implemented method comprising:
    grouping the nodes of the blockchain network into a plurality of clusters of nodes;
    for at least one cluster within the plurality of clusters of nodes:
        determining, for each node within the at least one cluster, performance parameter values;
        calculating, for each node within the at least one cluster, a weighted sum of the determined performance parameter values;
        designating a node, of the at least one cluster, with a highest weighted sum as a cluster leader;
        designating a number of nodes, of the at least one cluster, whose weighted sum is less than the highest weighted sum, as sub-cluster leaders, wherein those nodes designated as the cluster leader and the sub-cluster leaders represent a predefined percentage of the weighted sums of the performance parameter values of the at least one cluster;
        dynamically adjusting transaction throughput of the blockchain network so that the transaction throughput does not deviate from a transaction load generated by the at least one cluster; and
        verifying the transaction for the at least one cluster by the cluster leader and the sub-cluster leaders, wherein verifying comprises concluding the transaction information in a block that is published to the blockchain network after the transaction is broadcast to the network.

2. The computer-implemented method of claim 1, wherein the performance parameter values comprise at least one parameter selected from the group consisting of a number of transactions performed by the node in a first given time period, a number of transactions verified by the node in a second given time period, a period during which the node has been part of the blockchain network, a percentage of up-time of the node in the blockchain network, a processing power of the node measurable in floating point operations per second or number of hash calculations, memory and/or storage capacities, network bandwidth, CPU clock rate, number of CPUs, bus throughput, and number of threads per CPU.

3. The computer-implemented method of claim 1, wherein the transaction is part of a distributed ledger program.

4. The computer-implemented method of claim 1, wherein the nodes are geographically distributed.

5. The computer-implemented method of claim 1, wherein the nodes of one of the clusters are co-located.

6. The computer-implemented method of claim 5, wherein the clusters are geographically distributed.

7. The computer-implemented method of claim 1, wherein a portion of the nodes of one of the clusters are of different technical architectures and/or run under different operating systems.

8. The computer-implemented method of claim 1, wherein a portion of the nodes comprises a co-processor for hash value calculations.

9. The computer-implemented method of claim 1, wherein a plurality of transactions is combined to a block and wherein a copy of the block is stored by each designated cluster leader.

10. A computer system for verifying a transaction in a blockchain network, the blockchain network comprising nodes participating in performing the transaction, the computer system comprising:
- a computer having a processor and a tangible storage device; and
- a program embodied on the tangible storage device for execution by the processor, the program having a plurality of program instructions, comprising instructions for:
  - program instructions to group the nodes of the blockchain network into a plurality of clusters of nodes;
  - for at least one cluster within the plurality of clusters of nodes:
    - program instructions to determine, for each node within the at least one cluster, performance parameter values;
    - program instructions to calculate, for each node within the at least one cluster, a weighted sum of the determined performance parameter values;
    - program instructions to designate a node, of the at least one cluster, with a highest weighted sum as a cluster leader;
    - program instructions to designate a number of nodes, of the at least one cluster, whose weighted sum is less than the highest weighted sum, as sub-cluster leaders, wherein those nodes designated as the cluster leader and the sub-cluster leaders represent a predefined percentage of the weighted sums of the performance parameter values of the at least one cluster;
    - program instructions to dynamically adjust transaction throughput of the blockchain network so that the transaction throughput does not deviate from a transaction load generated by the at least one cluster; and
    - program instructions to verify the transaction for the at least one cluster by the cluster leader and the sub-cluster leaders, wherein verifying comprises concluding the transaction information in a block that is published to the blockchain network after the transaction is broadcast to the network.

11. The computer system according to claim 10, wherein the performance parameter values comprise at least one parameter selected from the group consisting of a number of transactions performed by the node in a first given time period, a number of transactions verified by the node in a second given time period, a period during which the node has been part of the blockchain network, a percentage of up-time of the node in the blockchain network, and a processing power of the node measurable in floating point operations per second or number of hash calculations, memory and/or storage capacities, network bandwidth, CPU clock rate, number of CPUs, bus throughput, and number of threads per CPU.

12. The computer system according to claim 10, wherein the transaction is part of a distributed ledger program.

13. The computer system according to claim 10, wherein the nodes are geographically distributed.

14. The computer system according to claim 10, wherein the nodes of one of the clusters are co-located.

15. The computer system according to claim 14, wherein the clusters are geographically distributed.

16. The computer system according to claim 10, wherein a portion of the nodes of one of the clusters are of different technical architectures and/or run under different operating systems.

17. The computer system according to claim 10, wherein a portion of the nodes comprises a co-processor for hash value calculations.

18. The computer system according to claim 10, wherein a plurality of transactions are combined to a block and wherein a copy of the block is stored by each designated cluster leader.

19. A computer program product for verifying a transaction in a blockchain network, the blockchain network comprising nodes participating in performing the transaction, the computer program product comprising:
- one or more computer-readable tangible storage devices and program instructions stored on at least one of the one or more computer-readable tangible storage devices, the program instructions comprising:
  - program instructions to group the nodes of the blockchain network into a plurality of clusters of nodes;
  - for at least one cluster within the plurality of clusters of nodes:
    - program instructions to determine, for each node within the at least one cluster, performance parameter values;
    - program instructions to calculate, for each node within the at least one cluster, a weighted sum of the determined performance parameter values;
    - program instructions to designate a node, of the at least one cluster, with a highest weighted sum as a cluster leader;
    - program instructions to designate a number of nodes, of the at least one cluster, whose weighted sum is less than the highest weighted sum, as sub-cluster leaders, wherein those nodes designated as the cluster leader and the sub-cluster leaders represent a predefined percentage of the weighted sums of the performance parameter values of the at least one cluster;
    - program instructions to dynamically adjust transaction throughput of the blockchain network so that the transaction throughput does not deviate from a transaction load generated by the at least one cluster; and
    - program instructions to verify the transaction for the at least one cluster by the cluster leader and the sub-cluster leaders, wherein the program instructions to verify comprise program instructions to conclude the transaction information in a block that is published to the blockchain network after the transaction is broadcast to the network.

* * * * *